(12) United States Patent
Johansen (10) Patent No.: US 12,350,773 B2
(45) Date of Patent: Jul. 8, 2025

(54) TOOL ASSEMBLY FOR TENSIONING TOWER BOLTS OF A WIND TURBINE TOWER

(71) Applicant: Vestas Wind Systems A/S, Aarhus N. (DK)

(72) Inventor: Rasmus Sanderhoff Johansen, Hørning (DK)

(73) Assignee: Vestas Wind Systems A/S, Aarhus N. (DK)

( * ) Notice: Subject to any disclaimer, the term of this patent is extended or adjusted under 35 U.S.C. 154(b) by 575 days.

(21) Appl. No.: 17/611,944

(22) PCT Filed: May 19, 2020

(86) PCT No.: PCT/DK2020/050144
§ 371 (c)(1),
(2) Date: Nov. 17, 2021

(87) PCT Pub. No.: WO2020/233763
PCT Pub. Date: Nov. 26, 2020

(65) Prior Publication Data
US 2022/0219269 A1    Jul. 14, 2022

(30) Foreign Application Priority Data
May 21, 2019 (DK) .............. PA 2019 70318

(51) Int. Cl.
*B23P 19/06* (2006.01)
*F03D 13/10* (2016.01)

(52) U.S. Cl.
CPC ............ *B23P 19/067* (2013.01); *F03D 13/10* (2016.05); *F05B 2260/301* (2013.01)

(58) Field of Classification Search
CPC ..... B25B 21/00; B25B 21/001; B25B 21/002; B25B 21/007; B25B 21/02;
(Continued)

(56) References Cited

U.S. PATENT DOCUMENTS

| 285,484 A | * | 9/1883 | Henley | ................... | B23P 19/06 |
| | | | | | 74/386 |
| 4,676,703 A | * | 6/1987 | Swanson | ................... | B25F 3/00 |
| | | | | | 408/239 R |

(Continued)

FOREIGN PATENT DOCUMENTS

| CN | 103225589 A | 7/2013 |
| CN | 104279131 A | 1/2015 |

(Continued)

OTHER PUBLICATIONS

China National Intellectual Property Administration, office action issued in corresponding Chinese Patent Application No. 202080049587.9, dated Apr. 26, 2023, with English translation.
(Continued)

*Primary Examiner* — Robert J Scruggs
(74) *Attorney, Agent, or Firm* — Wood Herron & Evans LLP (57) ABSTRACT

A tool assembly (1) for tensioning tower bolts (12) of a wind turbine tower is disclosed. The tool assembly (1) comprises a connecting arrangement (2, 13, 14) configured to connect the tool assembly (1) to a part of a wind turbine tower, and a tool holding part (3) arranged to hold a tool (5) for tensioning tower bolts (12). The tool holding part (3) is attached to the connecting arrangement (2, 13, 14) in a rotatable manner, thereby allowing the tool (5) to be rotated between at least a first orientation and a second orientation. The connecting arrangement (2, 13, 14) may retain the tool assembly (1) relative to a tower wall by means of a magnet (17).

16 Claims, 9 Drawing Sheets

(58) Field of Classification Search
CPC ..... B25B 23/0078; B25B 23/14; B25B 29/00; B25B 29/02; B23P 19/067; B23P 19/068; F03D 13/10; F05B 2230/00; F05B 2260/301; B25H 1/0021
See application file for complete search history.

(56) References Cited

U.S. PATENT DOCUMENTS

| | | | | |
|---|---|---|---|---|
| 5,367,924 | A * | 11/1994 | Henson | B25H 1/0028 81/57.24 |
| 5,580,021 | A * | 12/1996 | Gillanders | B25H 1/0028 74/89.17 |
| 10,024,484 | B2 * | 7/2018 | Brown | F16M 11/041 |
| 2011/0232071 | A1 | 9/2011 | Knoop et al. | |

FOREIGN PATENT DOCUMENTS

| | | | |
|---|---|---|---|
| CN | 107448360 A | | 12/2017 |
| EP | 2607685 A1 | | 6/2013 |
| EP | 3195991 A1 | | 7/2017 |
| KR | 20130025592 | * | 3/2013 |
| KR | 20130025592 A | | 3/2013 |
| KR | 20130026039 A | | 3/2013 |
| WO | 2007059768 A1 | | 5/2007 |
| WO | WO-2016193297 A1 | * | 12/2016 |
| WO | 2018113882 A1 | | 6/2018 |

OTHER PUBLICATIONS

Danish Patent and Trademark Office, Search and Examination Report in PA 2019 70318, Nov. 20, 2019.
European Patent Office, International Search Report and Written Opinion in PCT Application No. PCT/DK2020/050144, Aug. 14, 2020.
Intellectual Property India, Examination report issued in corresponding Indian Patent Application No. 202117058409, dated May 1, 2023, includes English translation.

* cited by examiner

TOOL ASSEMBLY FOR TENSIONING TOWER BOLTS OF A WIND TURBINE TOWER

FIELD OF THE INVENTION

The present invention relates to a tool assembly for tensioning tower bolts, i.e. bolts which are used when assembling tower sections of a wind turbine tower. The tool assembly of the invention allows the tower bolts to be tensioned from above as well as from below.

BACKGROUND OF THE INVENTION

Wind turbine towers are often made from a number of tower sections which are assembled, one above the other, during erection of the wind turbine. Neighbouring tower sections are connected to each other by means of a plurality of tower bolts extending through flanges formed on the respective tower sections. When the tower bolts have been positioned in through-going bolt holes formed in the flanges, they need to be tensioned. This is normally performed using a suitable tensioning tool, e.g. in the form of a hydraulic tool.

The tower bolts sometimes need to be tensioned from a position above the flanges, and sometimes from a position below the flanges. Therefore it is necessary to manually handle the bolt tensioning tool in order to position it above or below the flanges as required. This is strenuous and time consuming.

DESCRIPTION OF THE INVENTION

It is an object of embodiments of the invention to provide a tool assembly for tensioning tower bolts which enables easy and fast tensioning of the tower bolts.

According to a first aspect the invention provides a tool assembly for tensioning tower bolts of a wind turbine tower, the tool assembly comprising:
  a connecting arrangement configured to connect the tool assembly to a part of a wind turbine tower, and
  a tool holding part arranged to hold a tool for tensioning tower bolts,
  wherein the tool holding part is attached to the connecting arrangement in a rotatable manner, thereby allowing the tool to be rotated between at least a first orientation and a second orientation.

Thus, according to the first aspect, the invention provides a tool assembly for tensioning tower bolts. In the present context the term 'tower bolt' should be interpreted to mean a bolt which is used for connecting flanges of two neighbouring tower sections of a wind turbine tower.

The tool assembly comprises a connecting arrangement and a tool holding part. Thus, in the present context the term 'tool assembly' should be interpreted to mean an assembly of two or more parts, one of the parts being or comprising a tool.

The connecting arrangement is configured to connect the tool assembly to a part of a wind turbine tower. Thus, the tool assembly is retained relative to the wind turbine tower, via the connecting arrangement, and thereby the tool assembly can be arranged in a desired position, relative to tower flanges, and thereby relative to tower bolts to be tensioned.

The connecting arrangement could, e.g., be configured to allow the tool assembly to be suspended inside the wind turbine tower. As an alternative, the connecting arrangement may be configured to establish a connection to the tower wall and/or to the tower flanges. This will be described in further detail below.

The tool holding part is arranged to hold a tool for tensioning tower bolts. Accordingly, a standard tool for tensioning bolts may be mounted on the tool holding part. As an alternative, the tool may form part of the tool holding part.

The tool holding part is attached to the connecting arrangement in a rotatable manner. Accordingly, the tool holding part, and thereby a tool being held by the tool holding part, can rotate relative to the connecting arrangement. Thus, the tool is allowed to be rotated between at least a first orientation and a second orientation.

In the first orientation, the centreline of the tool is aligned with the centreline of a first bolt such that the two centrelines are parallel. In the second orientation, the centreline of the tool is aligned with the centreline of a second bolt such that the two centrelines are parallel. The centrelines of the first and second bolts may be parallel or non-parallel. When the angular rotation of the tool between the first and the second orientation is 180°, the centrelines are parallel. However, the bolt heads and nuts of the two bolts are oriented on opposite sides.

Since the tool can be rotated as described above, it can easily be positioned and oriented in such a manner that it can selectively be used for tensioning bolts below or above the tower flanges, while the tool assembly is kept in place by means of the connecting arrangement. This reduces the need for manual handling of the tool, and a switch between tensioning bolts below the flanges and above the flanges can be performed fast. Thereby the time and manual labour required during assembly of the tower sections is reduced, and the costs involved with erecting the wind turbine can therefore be reduced.

Furthermore, the bolts can easily be tensioned from below. This allows the bolts to be moved closer to the tower wall, in the case that the wind turbine tower is conical, without risking collisions between the bolt tensioning tool and the tower wall. This improves the strength of the wind turbine tower, thereby allowing the amount of material used for the wind turbine tower to be reduced. Thus, the manufacturing costs of the wind turbine tower can be reduced.

The tool holding part may be rotatable between the first orientation and the second orientation in a continuous manner, in which case the tool holding part may assume any orientation between the first orientation and the second orientation. Alternatively, the tool holding part may be rotatable between the first orientation and the second orientation in a discrete manner. In this case the tool holding part may be lockable in the first orientation and in the second orientation. Furthermore, the tool holding part may be lockable in one or more further orientations, e.g. one or more intermediate orientations between the first orientation and the second orientation.

The first orientation of the tool may arrange a bolt engaging portion of the tool in an upwards direction and the second orientation of the tool may arrange the bolt engaging portion of the tool in a downwards direction. This allows the tower bolts to be tensioned from below the flanges when the tool engaging portion is arranged in the upwards direction, and allows the tower bolts to be tensioned from above the flanges when the tool engaging portion is arranged in the downwards direction.

The connecting arrangement may comprise a wire, at least a part of the tool assembly thereby being suspended.

For instance, the wire may connect the connecting arrangement to the tower at an elevated position, e.g. to an upper tower flange. According to this embodiment, the wire of the connecting arrangement is attached to the tower at a point which is arranged above the flanges which are to be connected by means of the tower bolts. Thereby the entire tool assembly is suspended from this elevated point, via the wire. This allows the tool assembly, and thereby a tool mounted on the tool holding part, to be easily moved relative to the flanges and the tower bolts.

As an alternative, the wire may interconnect two parts of the connecting arrangement to each other, where one of the parts is connected to the tool holding part and the other one is connected to the tower. In this case the tool holding part and part of the connecting arrangement are suspended.

As another alternative, the tool holding part may be attached to the connecting arrangement via the wire. In this case the tool holding part is suspended. Alternatively or additionally, the connecting arrangement may comprise a magnet for retaining at least a part of the connecting arrangement relative to a tower wall. This requires that the tower wall is made from a magnetisable material, and therefore this embodiment is particularly relevant for steel towers.

According to this embodiment, the connecting arrangement can easily be positioned at any suitable position along the tower wall. In particular, the connecting arrangement can be positioned near a bolt to be tensioned, and it can easily be moved along the circumference of the tower wall to reach all of the tower bolts.

In the case that the connecting arrangement comprises a magnet as described above, the connecting arrangement may further comprise a trolley, the magnet may be provided on the trolley, and the trolley may be provided with one or more displacement means allowing the trolley to move along a surface of the tower wall.

According to this embodiment, a part of the connecting arrangement, i.e. the trolley, can easily be moved along the tower wall, e.g. circumferentially, while being retained by means of the magnet in the sense that the trolley will not fall or slide along the wall due to gravity acting on the tool assembly.

The displacement means may be passive in the sense that an operator must push or pull the connecting part in order to displace the trolley along the tower wall. Examples of such passive displacement means include wheels, rollers, etc., allowing the trolley to roll on the tower wall.

As an alternative, the displacement means may be active or motor driven. Examples of such active displacement means include caterpillar tracks, motor driven wheels, etc. In the case that the displacement means include caterpillar tracks, the magnets may be arranged in or form part of the caterpillar tracks.

In any event, the displacement means may advantageously exhibit low rolling friction along the direction of displacement. Thereby the trolley can easily be moved in the direction of displacement.

The trolley may further comprise adjusting means for adjusting a distance between the magnet and the tower wall.

The force acting between the magnet and the tower wall is reduced when the distance between the magnet and the tower wall is increased, and vice versa. Accordingly, by adjusting the distance between the magnet and the tower wall, the magnetic force which retains the trolley relative to the tower wall is also adjusted.

If the magnetic force is very large, the trolley is firmly retained with respect to the tower wall, and the risk of the trolley falling or sliding along the tower wall due to gravity acting on the tool assembly is therefore very low. On the other hand, a very large magnetic force makes it very difficult to remove the trolley from the tower wall, and this may be undesirable.

Similarly, if the magnetic force is very small, the trolley can easily be removed from the tower wall. On the other hand, there is a higher risk that the trolley falls or slides along the tower wall due to gravity acting on the tool assembly.

It is therefore advantageous that the magnetic force can be varied by adjusting the distance between the magnet and the tower wall. Thereby a small distance, and thereby a large magnetic force, can be selected during operation of the tool assembly, while a larger distance, and thereby a smaller magnetic force, can be selected when it is desired to remove the trolley from the tower wall, e.g. when all bolts of a flange connection have been tensioned.

Normally, the magnet will always be positioned with a gap between the magnet and the tower wall in order to prevent friction between the magnet and the tower wall caused by direct contact there between. Thus, a small gap between the magnet and the tower wall ensures that the trolley can be easily moved in the direction of displacement.

The adjusting means may, e.g., include a threaded connection between two threaded parts, e.g. an outer thread formed on a bolt and an inner thread formed in a corresponding hole. In this case the threaded connection may cause a translational movement of the magnet when one of the threaded parts is rotated. Alternatively or additionally, the adjusting means may comprise one or more levering arms, or any other suitable kind of adjustment mechanism.

The tool assembly may further comprise a releasable locking arrangement for releasably locking the tool holding part in the first orientation and in the second orientation.

According to this embodiment, the tool holding part is locked while it is in the first orientation or in the second orientation, and thereby it is prevented from accidentally rotating away from a given orientation during operation of the tool. However, when it is desired to rotate the tool holding part from the first orientation to the second orientation, or vice versa, the releasable locking arrangement can be released, thereby allowing the tool holding part to rotate freely. Once the second (or first) orientation has been reached, the releasable locking arrangement can once again be locked, and the tool holding part is locked in this orientation.

The releasable locking arrangement could, e.g., include mechanical locking means, such as one or more movable locking pins, one or more latches, etc. Alternatively or additionally, the releasable locking arrangement may include one or more magnets, or any other suitable kind of releasable locking means.

According to a second aspect the invention provides a trolley configured to move along a substantially vertical steel surface, the trolley comprising:

a magnet for retaining the trolley relative to the substantially vertical steel surface, and one or more displacement means allowing the trolley to move along the substantially vertical steel surface.

The trolley according to the second aspect of the invention could, e.g., be or form part of a connecting arrangement of a tool assembly according to the first aspect of the invention. Accordingly, any feature described in combination with the first aspect of the invention could also be combined with the second aspect of the invention, and vice versa, and the remarks set forth above are therefore equally applicable here.

The trolley according to the second aspect of the invention is configured to move along a substantially horizontal direction on a substantially vertical steel surface. The steel surface could, e.g., be or form part of a tower wall of a wind turbine tower. Alternatively, the steel surface may form part of a building, a ship, etc.

The trolley comprises a magnet for retaining the trolley relative to the substantially vertical steel surface. Accordingly, the trolley is retained in a desired position relative to the substantially vertical steel surface by means of magnetic forces acting between the magnet and the steel surface, in the sense that the trolley is prevented from falling or sliding along the steel surface as a consequence of gravity acting on the trolley. This has already been described above with reference to the first aspect of the invention.

The trolley further comprises one or more displacement means allowing the trolley to move substantially horizontally on the substantially vertical steel surface. Accordingly, the trolley can easily be moved along the steel surface in a displacement direction, while it is prevented from falling or sliding along the steel surface due to gravity. As described above with reference to the first aspect of the invention, the displacement means may comprise wheels, rollers, caterpillar tracks or any other suitable kind of displacement means which enables a desired displacement of the trolley.

The trolley may further comprise adjusting means for adjusting a distance between the magnet and the substantially vertical steel surface. As described above, the magnetic force acting between the magnet and the steel surface, i.e. the force which retains the trolley relative to the steel surface, can thereby be varied. The remarks set forth above with reference to the first aspect of the invention in this regard are equally applicable here.

The adjusting means may comprise a first threaded portion arranged on the magnet and a second threaded portion arranged in threaded engagement with the thread of the first threaded portion, and rotation of the second threaded portion may cause the magnet to move towards or away from the substantially vertical steel surface. According to this embodiment, the rotational movement of the second threaded portion is transferred into a translational movement of the magnet. Such an arrangement is mechanically very simple.

As an alternative, the adjusting means may comprise a portion mounted on the trolley which can be moved into abutment with the substantially vertical steel surface and used for pushing the entire trolley away from the steel surface. In this case the movable portion is used as a lever arm, e.g. when it is desirable to remove the trolley from the steel surface.

The trolley may further comprise a tool holding part. According to this embodiment, a tool may be mounted on the trolley, and thereby the tool can be moved along the substantially vertical steel surface by means of the trolley in order to position the tool in various operating positions. The tool may, e.g., be a tool for tensioning tower bolts, in which case the trolley may form part of a tool assembly according to the first aspect of the invention. However, any other suitable kind of tool may be mounted on the trolley.

The tool may be connected directly to the trolley via a wire, in which case the tool holding part is or comprises the wire. In this case the tool is suspended from the trolley. As an alternative, the tool holding part may be connected to the trolley via a wire, in which case the tool holding part as well as the tool is suspended from the trolley. The tool holding part may, e.g., comprise a frame, such as a C-frame or the like. As another alternative, the tool may be connected to the trolley in any other suitable manner.

Alternatively or additionally, the trolley may be provided with a basket or similar for holding equipment, e.g. in the form of tools, bolts, spare parts etc. which needs to be moved to a specific position along the substantially vertical steel surface in order to be readily available for service personnel. Alternatively or additionally, the trolley may be provided with inspection equipment, such as cameras, sensors, etc., for inspecting the steel surface or parts connected to the steel surface.

The trolley may be retained relative to the substantially vertical steel surface by a retaining force, $F_R = \mu \cdot F_M$, where $\mu$ is the coefficient of friction between the displacement means and the steel surface, and $F_M$ is a magnetic force provided by the magnet.

According to this embodiment, the displacement means form an interface towards the substantially vertical steel surface. Thereby, the contact between the trolley and the steel surface is formed by the displacement means, e.g. in the form of wheels of the trolley. The retaining force is similar to a usual friction force, which is determined by the coefficient of friction and a normal force. In this case the magnetic force acts in a direction towards the steel surface, and thereby pushes the trolley towards the steel surface. Accordingly, the magnetic force acts in a manner similar to the normal force in the usual friction force case.

The retaining force, $F_R$, may be larger than a gravitational force, $F_g = m \cdot g$, acting on the trolley, where m is the total mass of the trolley and g is the standard gravitational acceleration. According to this embodiment, the retaining force provided by the magnet is sufficient to prevent the trolley from falling or sliding along the substantially vertical steel surface due to gravity acting on the trolley. Accordingly, the trolley is kept in position relative to the steel surface, except for movements caused by the displacement means.

BRIEF DESCRIPTION OF THE DRAWINGS

The invention will now be described in further detail with reference to the accompanying drawings in which.

DETAILED DESCRIPTION OF THE DRAWINGS

FIGS. 1-5 illustrate a tool assembly 1 according to an embodiment of the invention. The tool assembly 1 comprises a frame 2 forming part of a connecting arrangement, and a tool holding part 3. The frame 2 is arranged to be attached to a wire (not shown) via hole 4. The wire can be attached at an elevated position, such as a tower flange or a platform arranged at a vertically higher level, thereby mounting the tool assembly 1 on a wind turbine tower in a suspended manner.

The wire may include a spring balance (not shown) to enable position adjustment of the tool assembly 1 while balancing the weight of the tool assembly 1.

The tool holding part 3 has a tool 5 for tensioning tower bolts mounted thereon. The tool holding part 3 is connected to the frame 2 in such a manner that the tool holding part 3 can rotate about a pivot axis defined by a bolt 6. This will be described further below.

Figure 1:
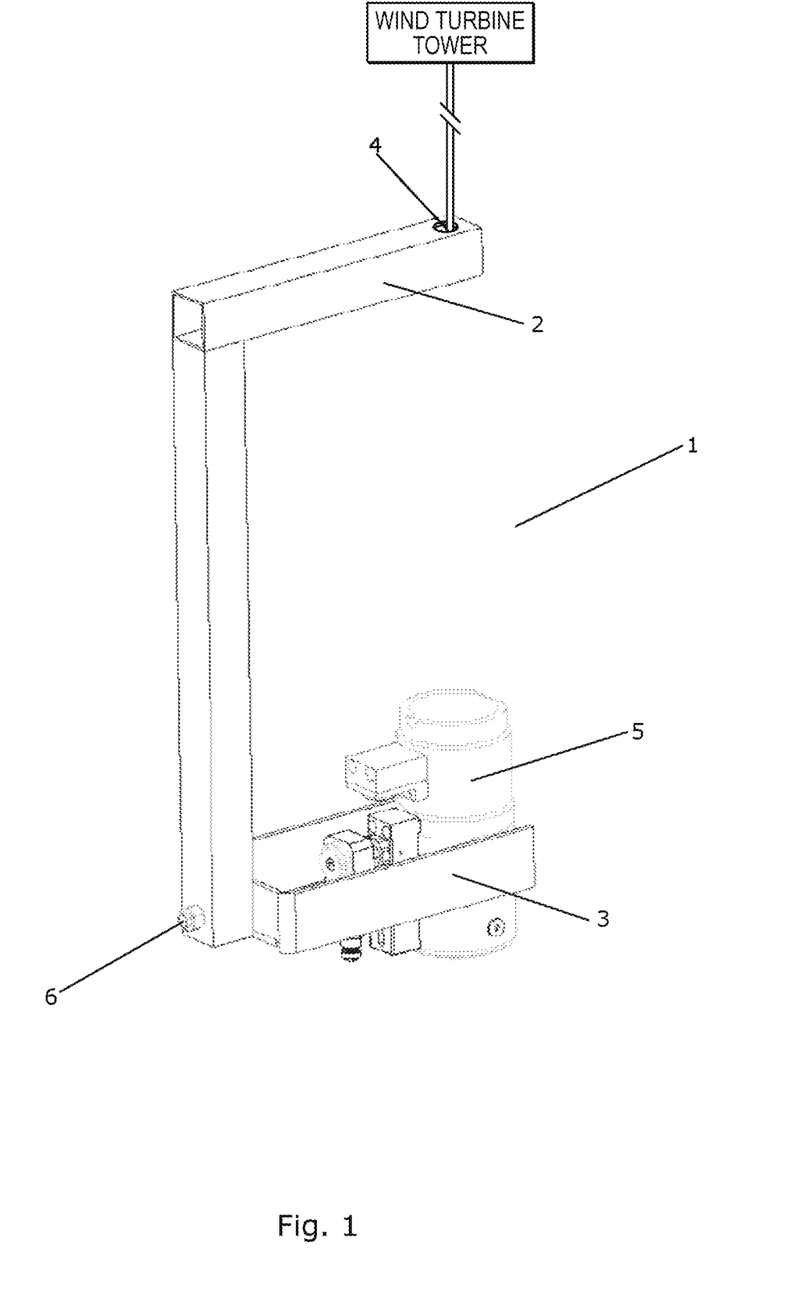
FIGS. 1-5 illustrate a tool assembly according to a first embodiment of the invention.

In FIG. 1 the tool holding part 3 is arranged in a first orientation, positioning the tool 5 in such a manner that it is capable of tensioning tower bolts from below. The tool holding part 3 may be locked in this position by means of a suitable locking mechanism, thereby preventing the tool holding part 3 from accidentally rotating away from this orientation.

Figure 2:
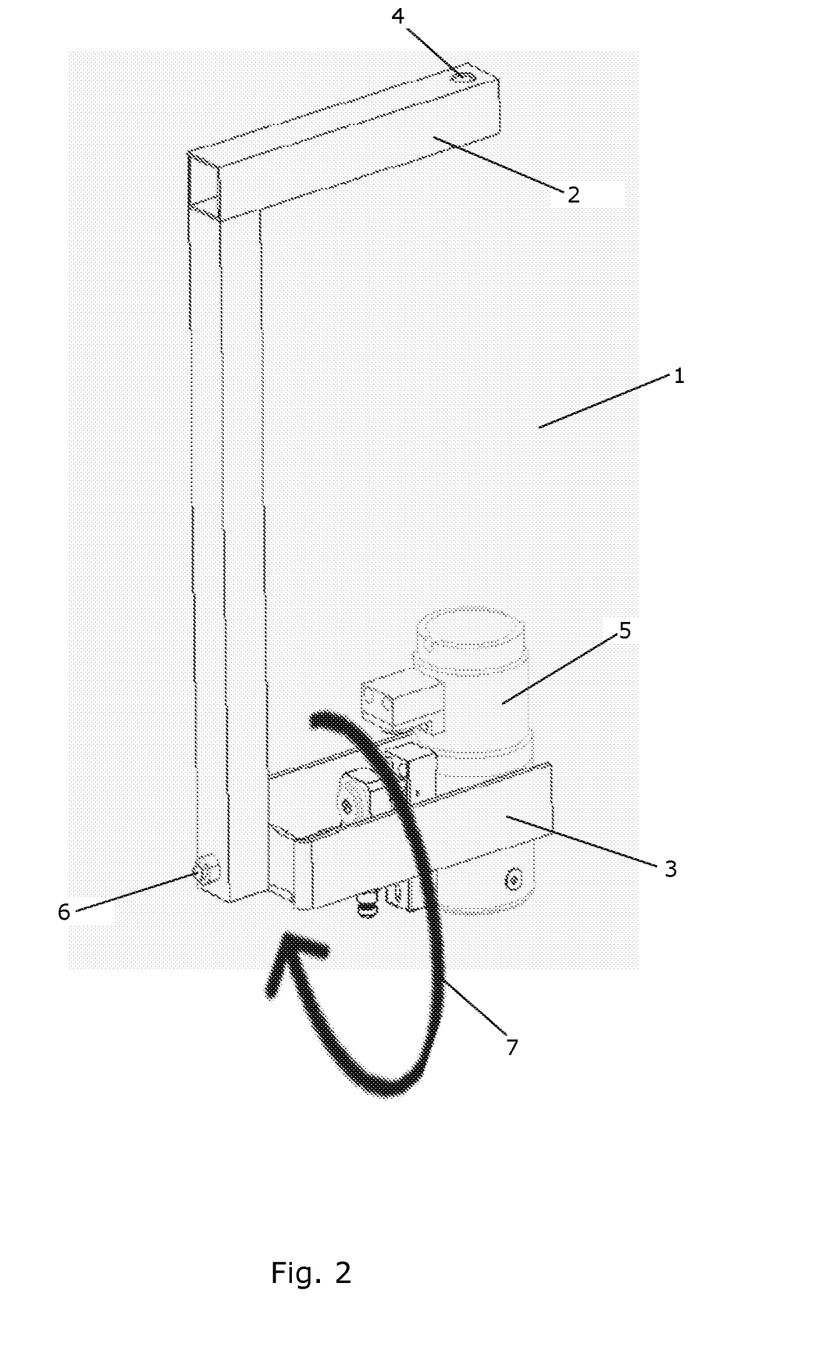

In FIG. 2 it is desired to rotate the tool holding part 3 to a second orientation relative to the frame 2. In the case that the tool holding part 3 is locked in the first orientation, the locking mechanism is released, thereby allowing the tool holding part 3 to rotate about the pivot axis defined by the bolt 6, as illustrated by arrow 7.

Figure 3:
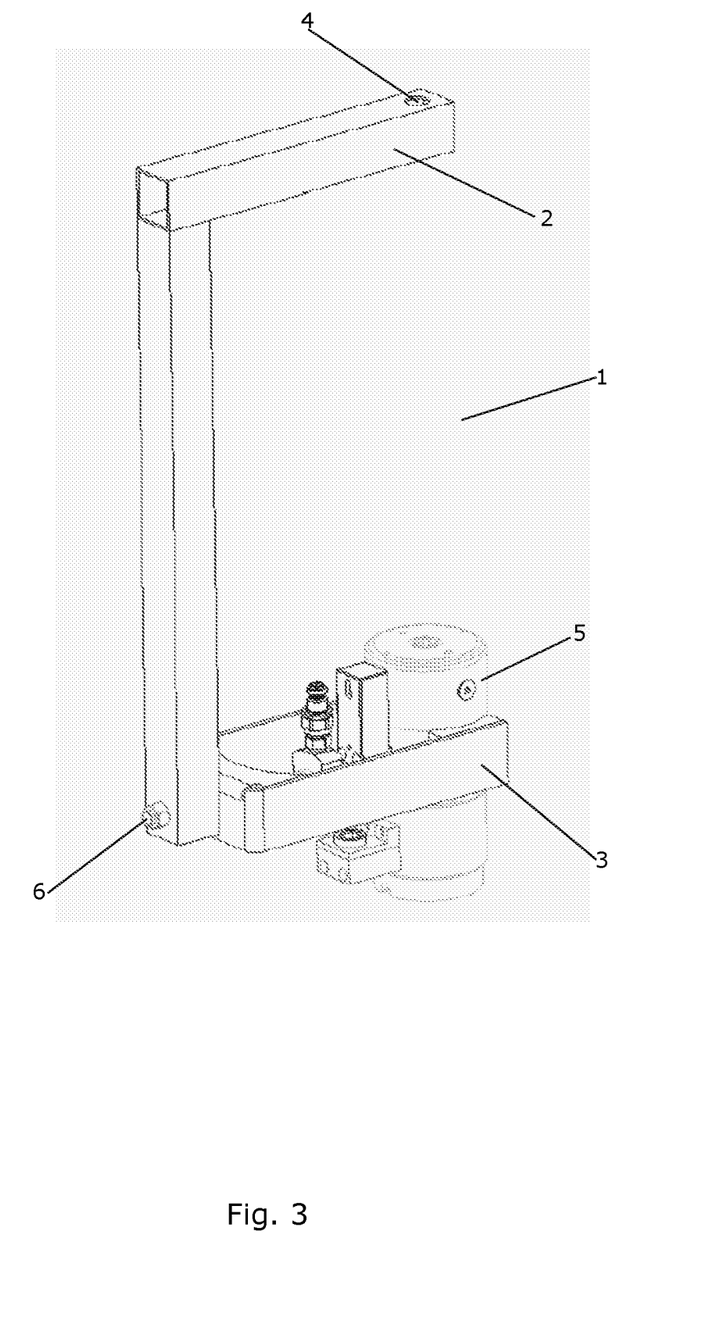

In FIG. 3 the tool holding part 3 has been rotated 180° about the pivot axis defined by the bolt 6. Thereby the tool holding part 3 has been positioned in a second orientation relative to the frame 2, in which the tool 5 is capable of tensioning tower bolts from above. The tool holding part 3 may once again be locked in this position by means of the locking mechanism, thereby preventing the tool holding part 3 from accidentally rotating away from the second orientation.

Figure 4:
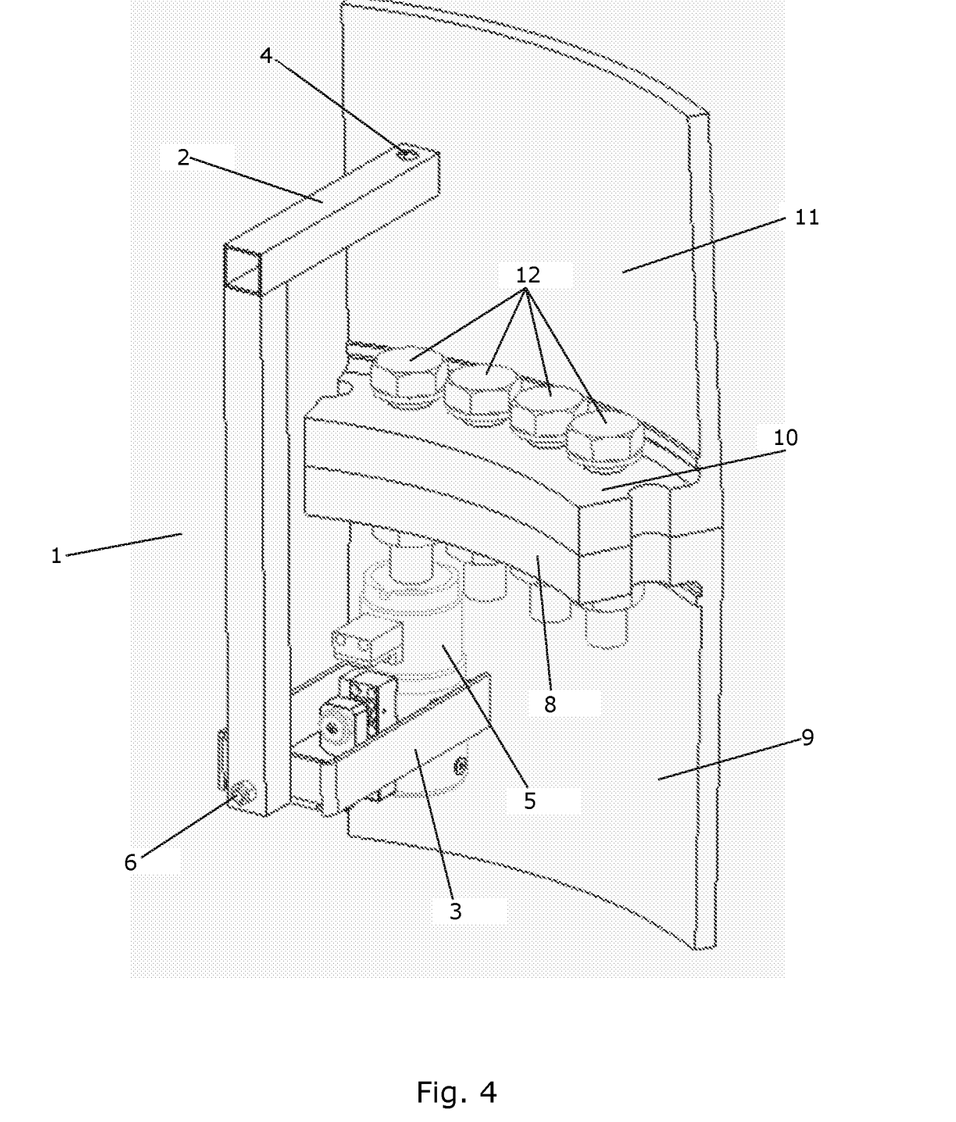

FIG. 4 shows the tool assembly 1 arranged adjacent to a flange connection comprising an upper flange 8 of a first tower section 9 and a lower flange 10 of a second tower section 11. A plurality of bolts 12, four of which are shown, are extending through bolt holes formed in the flanges 8, 10.

The tool assembly 1 is suspended via a wire (not shown), as described above.

The tool holding part 3 of the tool assembly 1 is positioned in the first orientation, as illustrated in FIG. 1. Thereby the tool 5 is capable of tensioning the tower bolts 12 from below.

Figure 5:
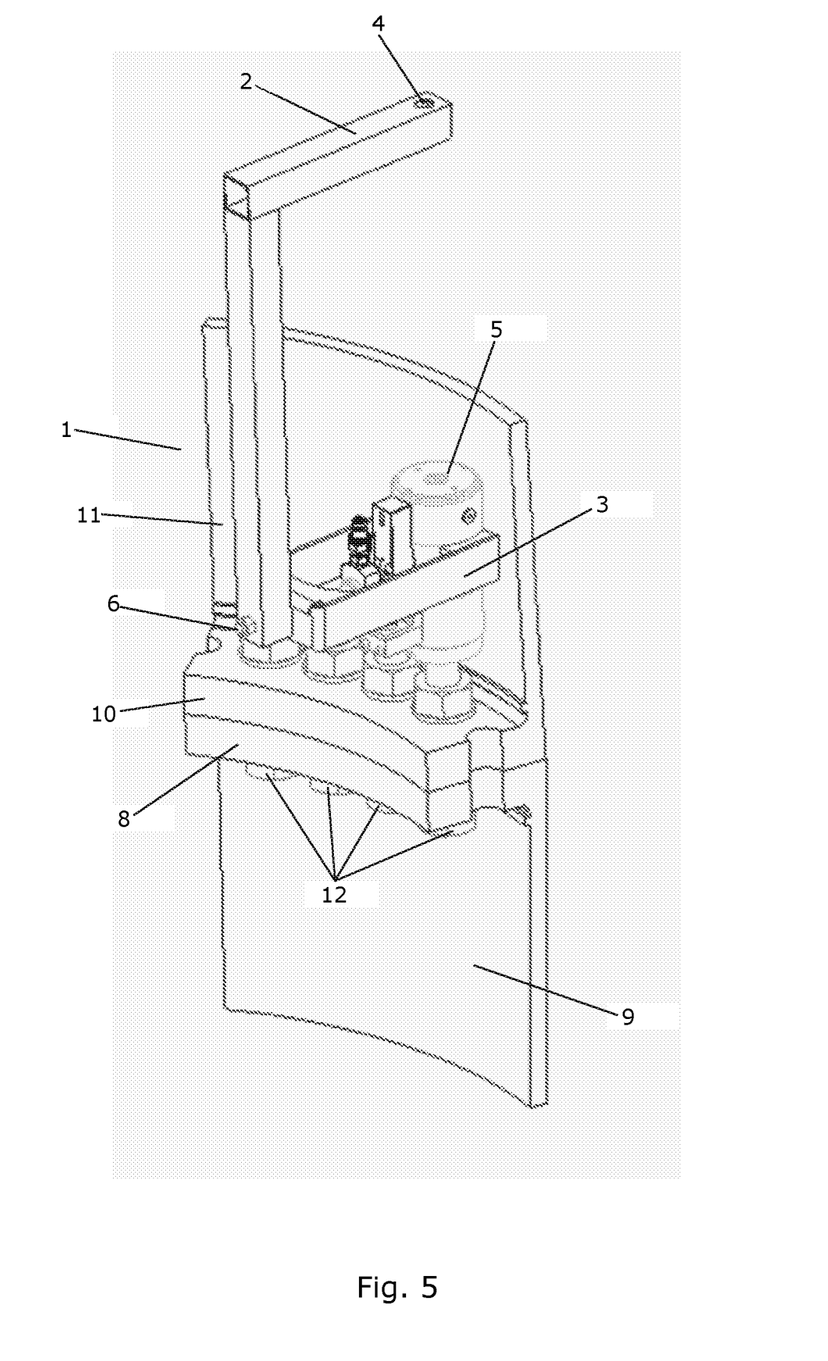

In FIG. 5 the tool holding part 3 has been rotated to the second orientation, as illustrated in FIG. 3, and the tool holding part 3 has been lifted to a position above the flanges 8, 10. Accordingly, the tool 5 is now capable of tensioning the bolts 12 from above.

It is an advantage, that the tool 5 is capable of tensioning the bolts 12 from below as well as from above, and that this can be selected simply be rotating the tool holding part 3 relative to the frame 2, between the first orientation and the second orientation. Thereby tensioning of the tower bolts 12 can be performed easily and fast, and with minimal manual labour.

Figure 6:
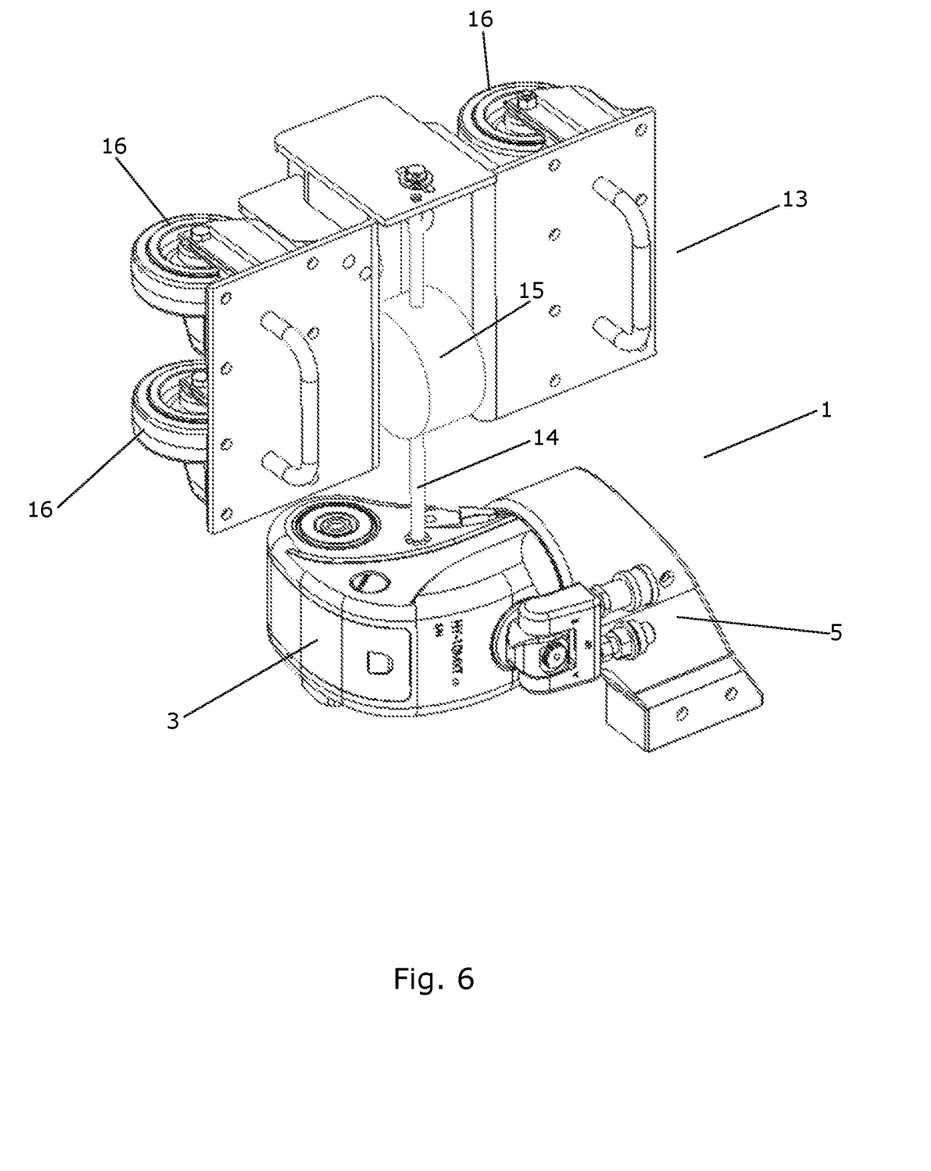
FIGS. 6-8 illustrate a tool assembly according to a second embodiment of the invention comprising a trolley according to an embodiment of the invention.
Figure 7:
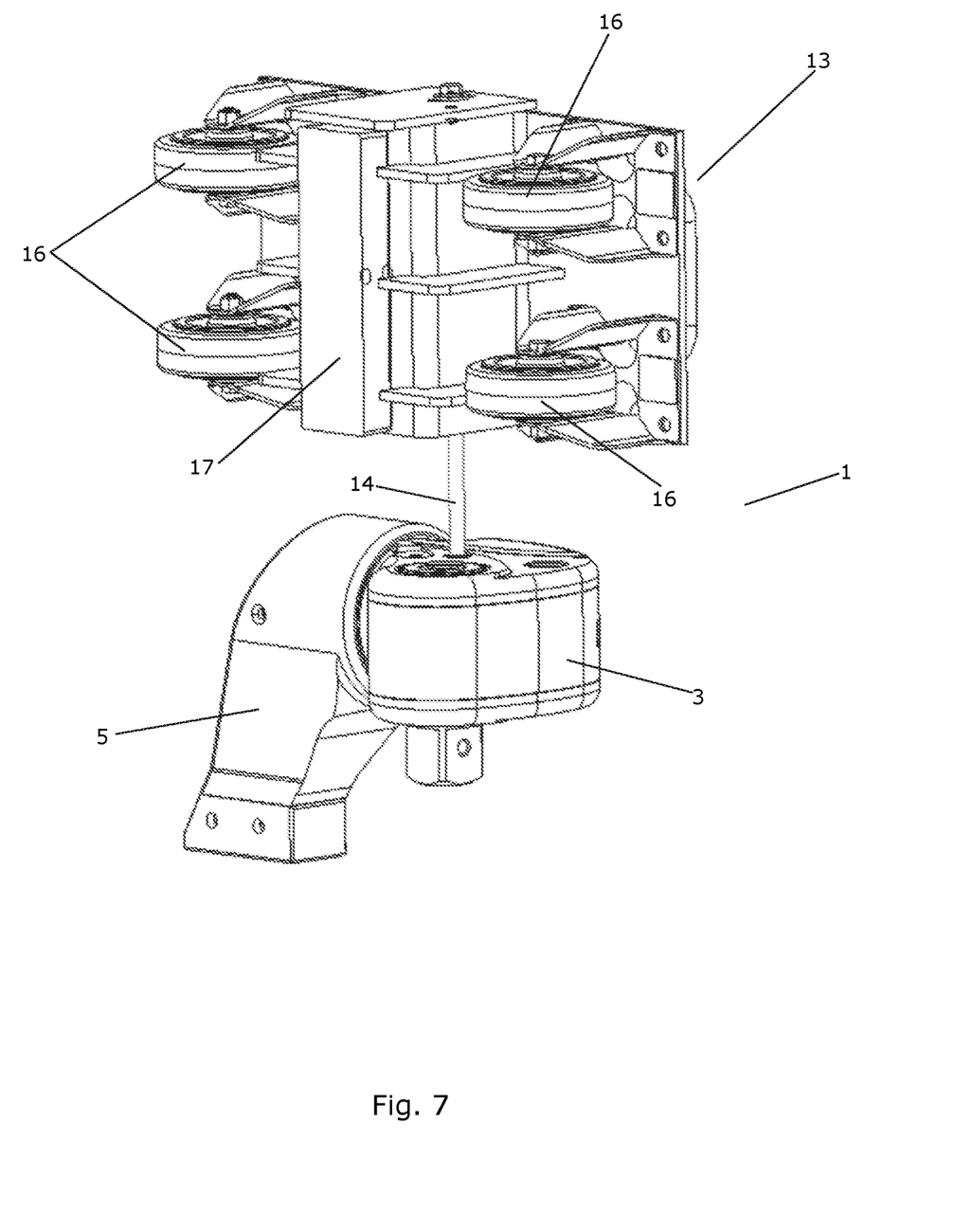
Figure 8:
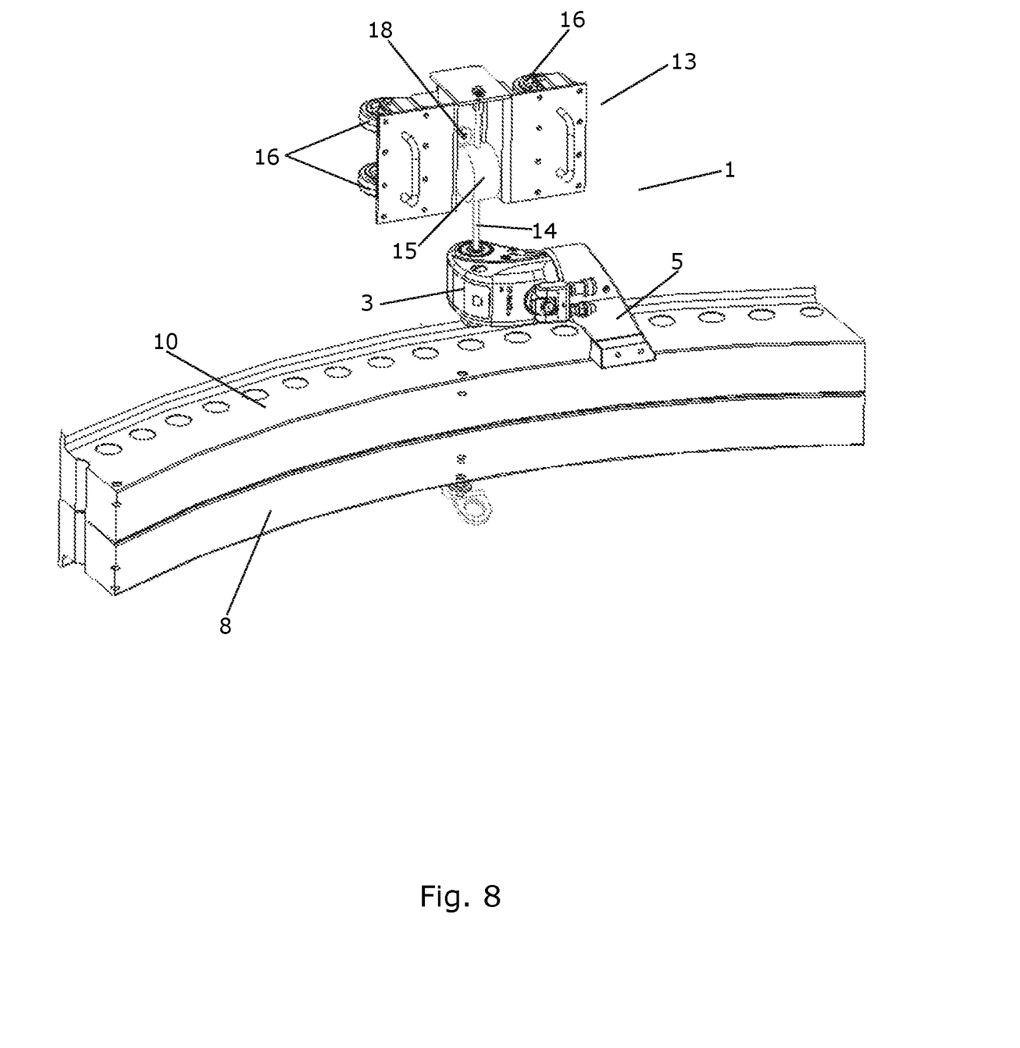

FIGS. 6-8 illustrate a tool assembly 1 according to a second embodiment of the invention. The tool assembly 1 of FIGS. 6-8 also comprises a connecting assembly and a tool holding part 3. A tool 5 for tensioning tower bolts is mounted in the tool holding part 3. In FIGS. 6-8 the connecting assembly comprises a trolley 13. The trolley 13 and the tool holding part 3 are connected to each other via a wire 14 and a spring balancer 15. The length of the wire 14, and thereby the distance between the trolley 13 and the tool holding part 3, can be adjusted by means of the spring balancer 15.

The trolley 13 comprises displacement means in the form of four wheels 16 which are arranged to roll along a substantially vertical steel surface, such as a wall of a wind turbine tower, as illustrated in FIG. 8. The trolley 13 further comprises a magnet 17 which faces the substantially vertical steel surface when the wheels 16 are arranged in contact with the substantially vertical steel surface. However, the magnet 17 is mounted on the trolley 13 in such a manner that a gap is formed between the magnet 17 and the substantially vertical steel surface, i.e. the magnet 17 is not positioned in contact with the substantially vertical steel surface. Accordingly, the trolley 13 can be moved along the substantially vertical steel surface, by means of the wheels 16, without introducing friction between the magnet 17 and the substantially vertical steel surface.

However, the magnet 17 is positioned sufficiently close to the substantially vertical steel surface to be able to retain the trolley 13 relative to the substantially vertical steel surface due to the magnetic force generated by the magnet 17.

Thus, the trolley 13 can be displaced easily and with very low friction along the substantially vertical steel surface, via the wheels 16, while the magnet 17 retains the trolley 13 relative to the substantially vertical steel surface, and thereby prevents that the trolley 13 accidentally falls or slides along the substantially vertical steel surface, due to gravity acting on the trolley 13.

The distance between the magnet 17 and the substantially vertical steel surface can be adjusted by means of an adjustment mechanism 18. Thereby the retaining force provided by the magnet 17 can be adjusted. For instance, during operation the magnet 17 may be adjusted to a position as close as possible to the substantially vertical steel surface, i.e. with a minimal gap between the magnet 17 and the substantially vertical steel surface. This results in a maximum retaining force, thereby minimising the risk of the trolley 13 accidentally falling or sliding along the substantially vertical steel surface due to gravity acting on the trolley 13. On the other hand, when it is desired to remove the trolley 13 from the substantially vertical steel surface, the magnet 17 may be adjusted to a position as far away from the substantially vertical steel surface as possible. This results in a minimal retaining force, thereby making it easier to pull the trolley 13 away from the substantially vertical steel surface.

Figure 9:
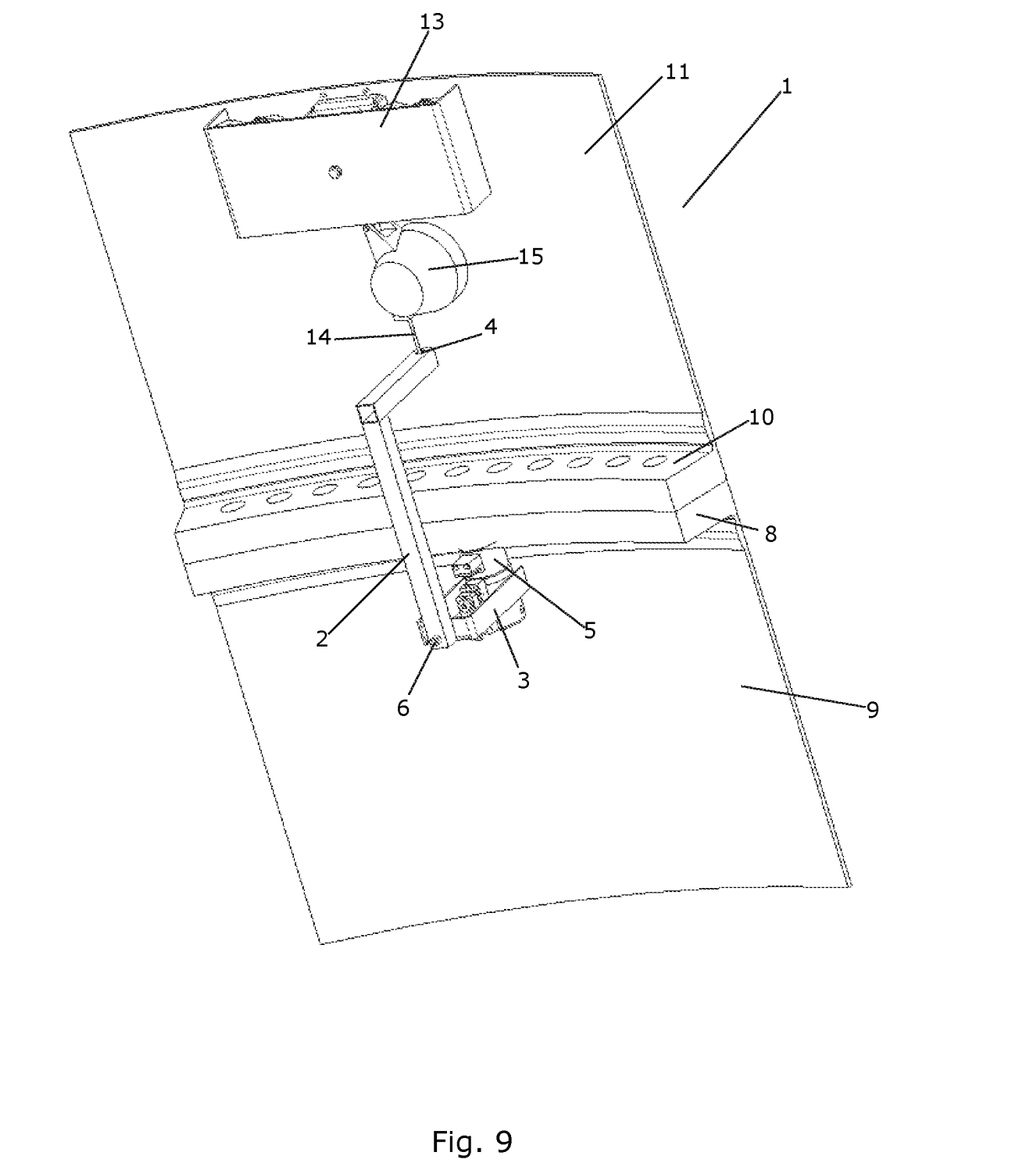
FIG. 9 illustrates a tool assembly according to a third embodiment of the invention comprising a trolley according to an embodiment of the invention.

FIG. 9 illustrates a tool assembly 1 according to a third embodiment of the invention arranged adjacent to a flange connection comprising an upper flange 8 of a first tower section 9 and a lower flange 10 of a second tower section 11. The tool assembly 1 of FIG. 9 comprises a frame 2 and tool holding part 3 as illustrated in FIGS. 1-5 and a trolley 13 as illustrated in FIGS. 6-8. The remarks set forth above are therefore equally applicable the embodiment of the FIG. 9, and the frame 2, the tool holding part 3 and the trolley 13 will not be described in detail here.

In FIG. 9, the frame 2 is connected to the trolley 13 via a wire 14 and a spring balancer 15. Accordingly, the frame 2 and the tool holding part 3 are suspended from the trolley 13.

The invention claimed is:

1. A tool assembly for tensioning tower bolts that connect flanges of two neighboring tower sections of a wind turbine tower, the tool assembly comprising:
    a connecting arrangement configured to connect the tool assembly to a part of the wind turbine tower, and
    a tool holding part arranged to hold a tool for tensioning the tower bolts,
    wherein the tool holding part is attached to the connecting arrangement in a rotatable manner, thereby allowing the tool to be rotated between at least a first orientation and a second orientation,
    wherein in the first orientation, the tool is configured to tension tower bolts that are located below the flanges of the two neighboring tower sections of the wind turbine tower, and wherein in the second orientation, the tool is configured to tension tower bolts that are located above the flanges of the two neighboring tower sections of the wind turbine tower.

2. The tool assembly according to claim 1, wherein the first orientation of the tool arranges a bolt engaging portion of the tool in an upwards direction and the second orientation of the tool arranges the bolt engaging portion of the tool in a downwards direction.

3. The tool assembly according to claim 1, wherein the connecting arrangement comprises a wire configured to be connected to the wind turbine tower for suspending the connecting arrangement from the wind turbine tower.

4. The tool assembly according to claim 1, wherein the connecting arrangement comprises a magnet for retaining at least a part of the connecting arrangement relative to a tower wall.

5. The tool assembly according to claim 4, wherein the connecting arrangement further comprises a trolley, wherein the magnet is provided on the trolley, and wherein the trolley is provided with one or more displacement means allowing the trolley to move along a surface of the tower wall.

6. The tool assembly according to claim 5, wherein the trolley further comprises adjusting means for adjusting a distance between the magnet and the tower wall.

7. The tool assembly according to claim 1, wherein the connecting arrangement further comprises a trolley configured to move along a tower wall, the trolley comprising:
a magnet for retaining the trolley relative to the tower wall, and
one or more displacement means allowing the trolley to move along the tower wall.

8. The trolley tool assembly according to claim 7, further comprising adjusting means for adjusting a distance between the magnet and the tower wall.

9. The tool assembly according to claim 8, wherein the adjusting means comprises a first threaded portion arranged on the magnet and a second threaded portion arranged in threaded engagement with the thread of the first threaded portion, and wherein rotation of the second threaded portion causes the magnet to move towards or away from the tower wall.

10. The trolley tool assembly according to claim 7, further comprising a tool holding part.

11. The trolley tool assembly according to claim 7, wherein the trolley is retained relative to the tower wall by a retaining force, $F_R = \mu \cdot F_M$, where $\mu$ is the coefficient of friction between the displacement means and the tower wall, and $F_M$ is a magnetic force provided by the magnet.

12. The tool assembly according to claim 11, wherein the retaining force, $F_R$, is larger than a gravitational force, $F_g = m \cdot g$, acting on the trolley, where m is the total mass of the trolley and g is the standard gravitational acceleration.

13. A tool assembly for tensioning tower bolts of a wind turbine tower, the tool assembly comprising:
a connecting arrangement configured to connect the tool assembly to a part of a wind turbine tower, the connecting arrangement comprising:
a wire having a first end and a second end, the first end configured to be connected to the wind turbine tower; and
a frame configured to be connected to the second end of the wire such that the frame is suspended from the wind turbine tower, and
a tool holding part arranged to hold a tool for tensioning tower bolts,
wherein the tool holding part is attached to the frame in a rotatable manner, thereby allowing the tool to be rotated between at least a first orientation and a second orientation.

14. The tool assembly according to claim 13, wherein the tool holding part is attached to the frame in a manner that prohibits translation of the tool holding part relative to the frame.

15. The tool assembly according to claim 13, wherein the tool holding part is rotatable relative to the frame about a pivot axis that is configured to extend through the tool.

16. The tool assembly according to claim 13, wherein the second end of the wire is configured to connect to the frame at a location that, in use, is above the tool holding part in the first and second orientations.

* * * * *

UNITED STATES PATENT AND TRADEMARK OFFICE
CERTIFICATE OF CORRECTION

PATENT NO. : 12,350,773 B2  
APPLICATION NO. : 17/611944  
DATED : July 8, 2025  
INVENTOR(S) : Rasmus Sanderhoff Johansen Page 1 of 1

It is certified that error appears in the above-identified patent and that said Letters Patent is hereby corrected as shown below:

In the Claims

Column 9, Line 33, Claim 8, change "trolley tool assembly" to -- tool assembly --.

Column 10, Line 1, Claim 10, change "trolley tool assembly" to -- tool assembly --.

Column 10, Line 3, Claim 11, change "trolley tool assembly" to -- tool assembly --.

Signed and Sealed this  
Twenty-sixth Day of August, 2025

Coke Morgan Stewart  
*Acting Director of the United States Patent and Trademark Office*